United States Patent
Evans et al.

(10) Patent No.: US 7,418,994 B2
(45) Date of Patent: Sep. 2, 2008

(54) FAN SHROUD WITH INTEGRAL HOOD SEAL

(75) Inventors: Mark David Evans, Grovetown, GA (US); Marlin Lavon Goodnight, Martinez, GA (US); Timothy Leopold Lessard, Evans, GA (US)

(73) Assignee: Deere & Company, Moline, IL (US)

( * ) Notice: Subject to any disclaimer, the term of this patent is extended or adjusted under 35 U.S.C. 154(b) by 569 days.

(21) Appl. No.: 10/866,289

(22) Filed: Jun. 11, 2004

(65) Prior Publication Data

US 2005/0274491 A1    Dec. 15, 2005

(51) Int. Cl.
*F01P 3/18*    (2006.01)

(52) U.S. Cl. ............. 165/41; 165/51; 165/121; 165/122; 123/41.49; 180/68.1; 180/68.4

(58) Field of Classification Search ............ 165/41, 165/51, 121, 122; 123/41.49; 180/68.4, 180/68.1
See application file for complete search history.

(56) References Cited

U.S. PATENT DOCUMENTS

| | | | |
|---|---|---|---|
| 2,715,448 A * | 8/1955 | Zeeb .................... | 180/68.4 |
| 3,987,766 A | 10/1976 | Welck ................... | 123/41.66 |
| 4,018,270 A | 4/1977 | Kolinger et al. ........... | 165/119 |
| 4,086,976 A | 5/1978 | Holm et al. .............. | 180/54 |
| 4,398,508 A | 8/1983 | Moon et al. ............. | 123/41.49 |
| 4,454,926 A | 6/1984 | Akins ................... | 180/68.1 |
| 4,886,135 A | 12/1989 | Nakamura et al. ......... | 180/68.1 |
| 5,427,502 A | 6/1995 | Hudson ................. | 415/211.1 |
| 5,927,390 A | 7/1999 | Lehman | |
| 6,298,906 B1 | 10/2001 | Vize | |
| 6,883,589 B2 * | 4/2005 | Ozawa et al. ............ | 165/41 |

FOREIGN PATENT DOCUMENTS

| | | |
|---|---|---|
| EP | 0 838 651 | 7/2002 |
| FR | 2 850 327 | 7/2004 |
| GB | 1 325 687 | 8/1973 |
| JP | 02196134 A * | 8/1990 |
| JP | 03292273 A * | 12/1991 |

* cited by examiner

*Primary Examiner*—John K Ford

(57) ABSTRACT

A one piece fan shroud for a tractor has first and second faces, a frame with top, left and right sides, a bottom, and an upper wall extending from the top of the frame. The upper wall, left and right sides of the fan shroud are dimensioned to match the internal geometry and seal with an internal surface of a tractor hood. A rubber seal may extend around the upper wall and the left and right sides of the frame.

5 Claims, 4 Drawing Sheets

FAN SHROUD WITH INTEGRAL HOOD SEAL

FIELD OF THE INVENTION

This invention relates generally to internal combustion engine cooling systems, and more particularly to shrouds for fans that force a flow of cooling air through or across the radiator of a utility vehicle such as a tractor.

BACKGROUND OF THE INVENTION

Utility vehicles such as tractors with internal combustion engines have engine cooling systems that draw air from a front grill through a radiator into the engine compartment. The engine cooling system typically includes a radiator assembly with a cooling fan surrounded by a shroud. The cooling fan may be provided to force flow of cooling air across the radiator. The radiator may be disposed forwardly of the cooling fan, and the cooling fan may be disposed-forwardly of the engine.

Optimum performance of the engine cooling system requires that air flow be blocked or minimized around the first or engine side of the radiator assembly (i.e., the hot engine compartment) to the second or cool side of the radiator assembly (i.e., the front grill). Efforts to seal the engine side from the cool side have involved various combinations of outward extensions from the radiator area, along with sealing materials such as foam or rubber to fill gaps between the radiator assembly and the vehicle hood and/or side panels. For example, seals may include foam or rubber material that fills gaps between the internal surface of the vehicle hood and the radiator assembly. Several pieces and/or sizes of sealing material may be needed because the size of the gaps may vary. An improved and simplified sealing arrangement is needed between the engine side and cool side of a tractor radiator assembly.

In addition to the radiator, fan, and fan shroud, the radiator assembly includes structural components that support the radiator and fan shroud and/or attach those structures to the frame or body of the vehicle, parts that seal the radiator assembly and air intake passages, and auxiliary items such as coolant recovery bottles. As a result, a typical radiator package has a large number of parts and requires substantial assembly time, at a significant cost. It is highly desirable to decrease vehicle cost by reducing the number of parts and shortening assembly time needed for a radiator assembly.

SUMMARY OF THE INVENTION

A one piece fan shroud for a tractor has first and second faces, a frame with top, left and right sides, a bottom, and an upper wall extending from the top of the frame. The upper wall, left and right sides of the fan shroud are dimensioned to match the internal geometry and seal with an internal surface of a tractor hood. A rubber seal may extend around the upper wall and the left and right sides of the frame.

DESCRIPTION OF THE PREFERRED EMBODIMENT

Figure 1:
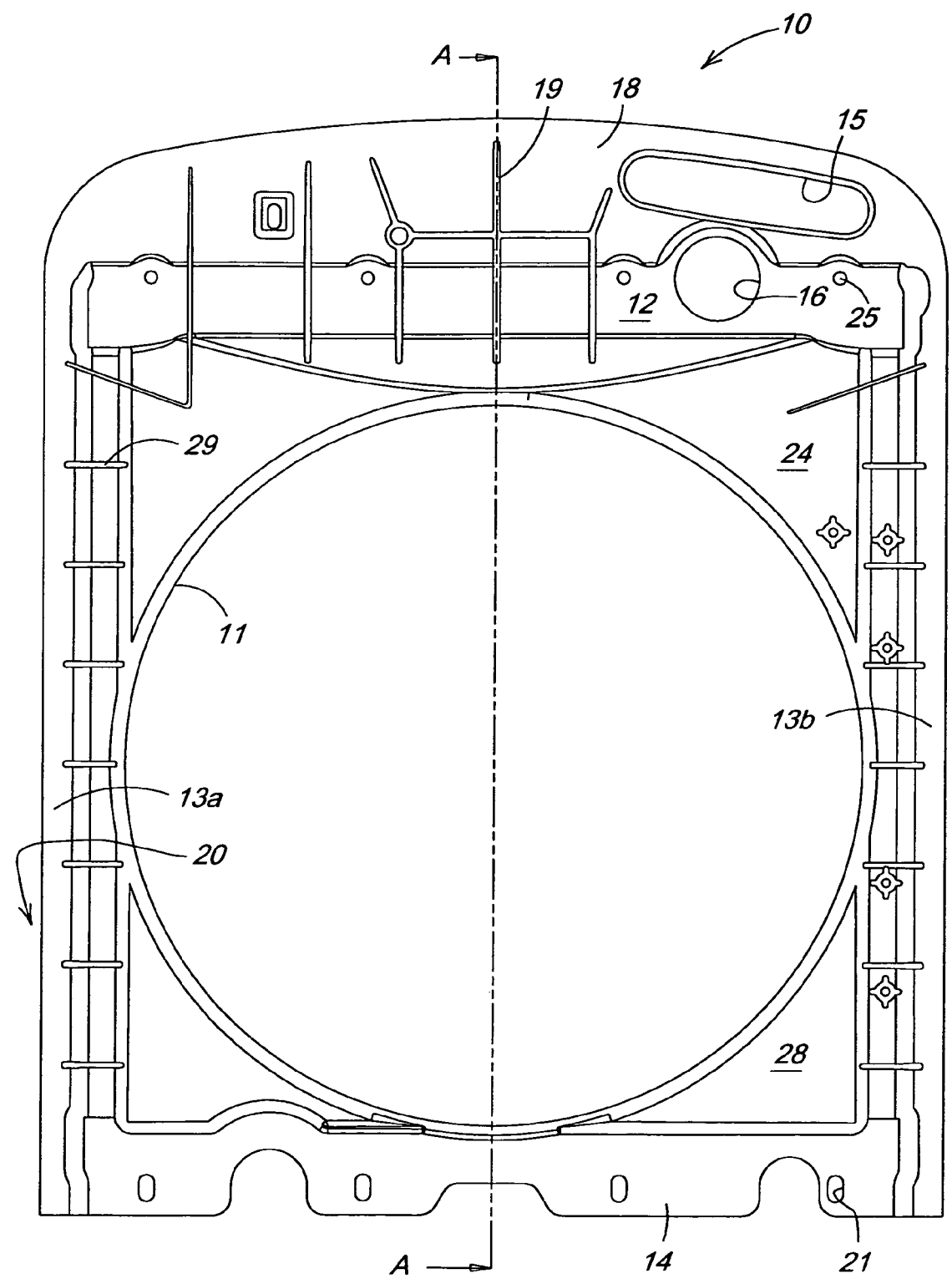
FIG. 1 is a rear view of a fan shroud according to a first embodiment of the invention.
Figure 2:
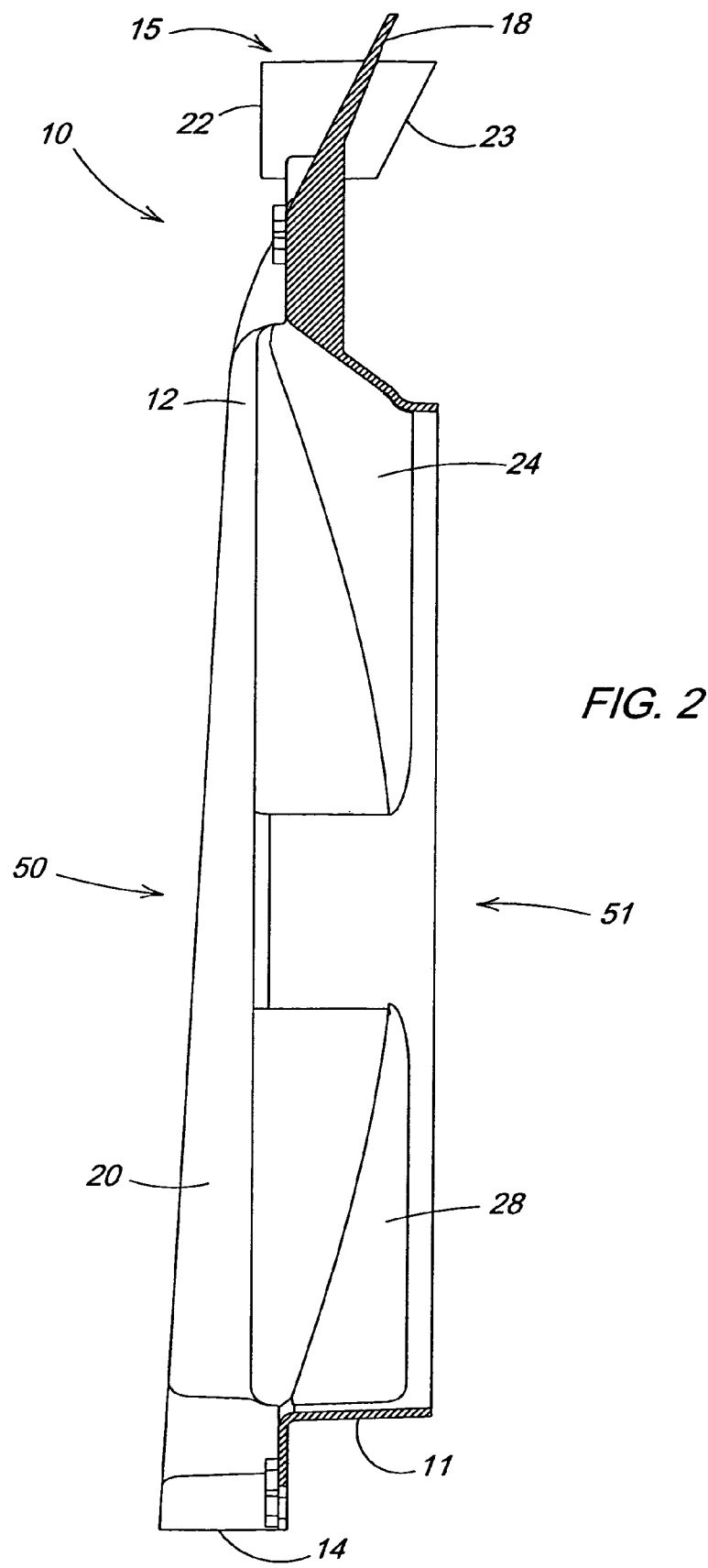
FIG. 2 is a section view of the fan shroud of FIG. 1, along line A-A.

First referring to FIGS. 1 and 2, fan shroud 10 is a one piece structure positioned on and/or over the frame or chassis of a utility vehicle such as a tractor. In one embodiment, fan shroud 10 is injection molded glass reinforced plastic. For example, the fan shroud may be molded or formed from a polymeric material such as glass fiber mineral reinforced, highly chemically coupled polypropylene. The fan shroud may have a nominal material wall thickness of between about 2 mm and about 10 mm, and most preferably about 3.5 mm. In one embodiment, the fan shroud may have ribs 19, 29 to enhance structural integrity or stiffness of the material. Alternatively, the fan shroud may be made from sheet metal.

In one embodiment, fan shroud 10 may have a generally rectangular or square frame 20 with four sides: top 12, left and right sides 13a and 13b, and bottom 14. When fan shroud 10 is positioned on a vehicle such as a tractor, frame 20 is oriented in a generally vertical plane, with a first face 50 facing the radiator, and a second face 51 facing the engine of the vehicle. In one embodiment, when fan shroud 10 is viewed from the side, such as in the side cross section view of FIG. 2, bottom 14 has a thicker cross section than top 12, giving frame 20 a slightly wedge shape appearance.

The fan shroud may have a generally cylindrical fan wall 11 projecting from second face 51 of the frame. The fan wall may surround a cooling fan (not shown) that rotates on a generally longitudinal axis. At each corner of frame 20, panels 24, 28 may connect the cylindrical fan wall to frame 20. The fan, which may be driven by an internal combustion engine, or may be electrically or hydraulically powered, and may have a plurality of blades which rotate to cause air to move through a radiator.

Figure 3:
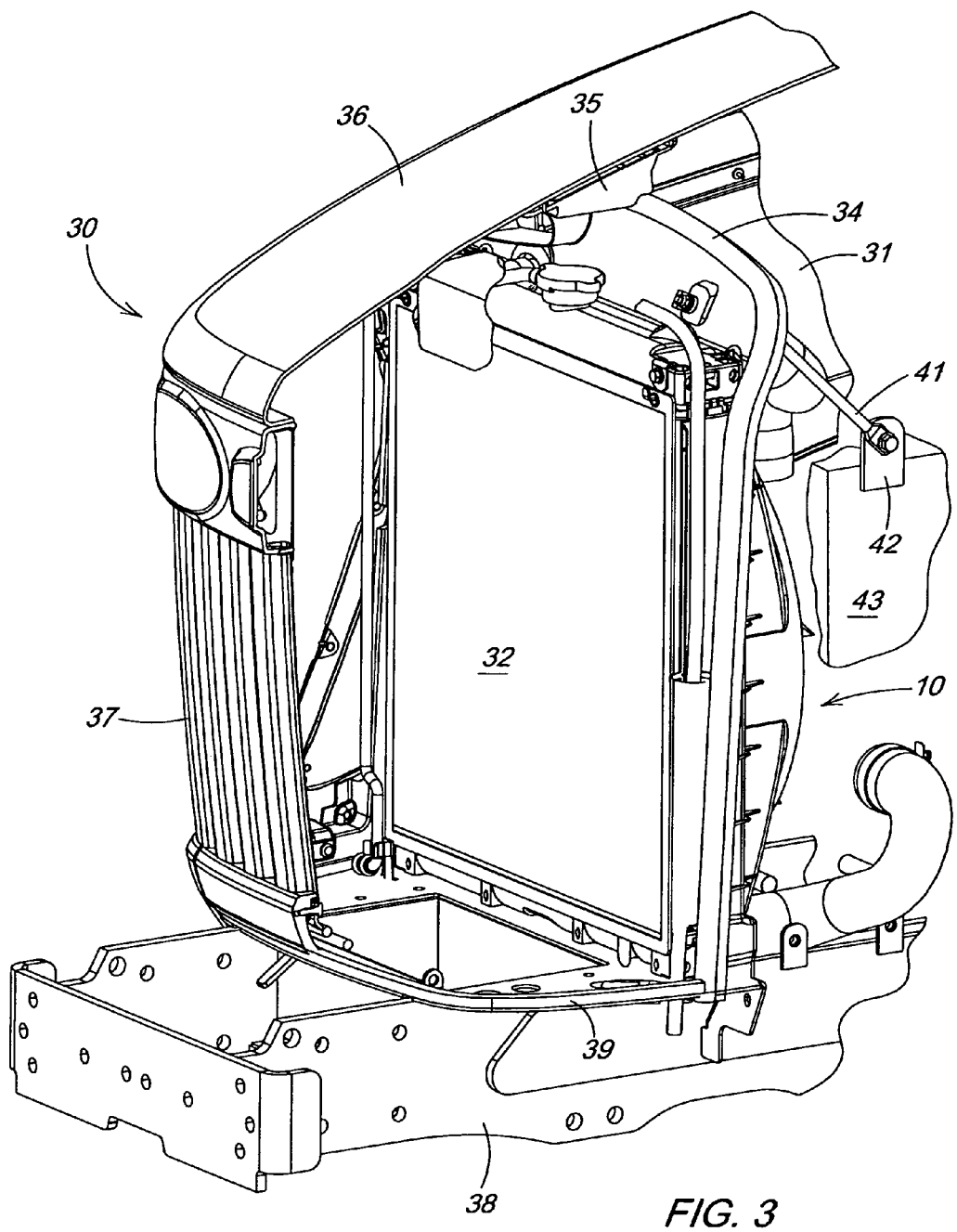
FIG. 3 is a perspective view, partially in section, of a tractor front end with a radiator assembly including a fan shroud according to an embodiment of the invention.

In one embodiment, fan shroud 10 may be fastened to and at least partially supported by the radiator. The fan shroud may be fastened to the radiator using a plurality of fasteners through openings 21, 25. The radiator may be attached to the frame using pegs and plastic or rubber isolators between the frame and radiator. Additionally, as shown in FIG. 3, rod 41 may be used to support or stabilize the fan shroud. For example, rod 41 may extend from the second face of the fan shroud, and the rod may be connected to bracket 42 attached to engine 43. Alternatively, the fan shroud may be fastened directly to the vehicle frame or chassis.

In one embodiment, upper wall 18 extends from top 12 of the frame. Upper wall 18 may extend vertically from the top of the frame, or may extend at an angle α with respect to the generally vertically aligned frame. For example, upper wall 18 may be at an angle of between about 10 degrees and about 60 degrees toward the second face, and most preferably about 30 degrees with respect to a vertical plane.

In one embodiment, one or more passages may extend through upper wall 18. For example, air intake opening 15 may extend through upper wall 18 to provide air for combustion. Air intake opening 15 may have inlet flange 22 extending or projecting outwardly from the cool air side of upper wall 18, and outlet flange 23 extending or projecting outwardly from the engine side of upper wall 18. In one embodiment, the inlet and outlet flanges may project sufficiently from upper wall 18 to enable connection of air intake ducts or hoses to the flanges. For example, each of the inlet and outlet flanges may project at least about one inch from upper wall 18. In one embodiment, the inlet flange may extend at least partially over the radiator 32. In one embodiment, the air intake opening may have a generally oblong shape in cross section. Additionally, opening 16 may extend through upper wall 18 for radiator hose 54 to extend therethrough.

Figure 4:
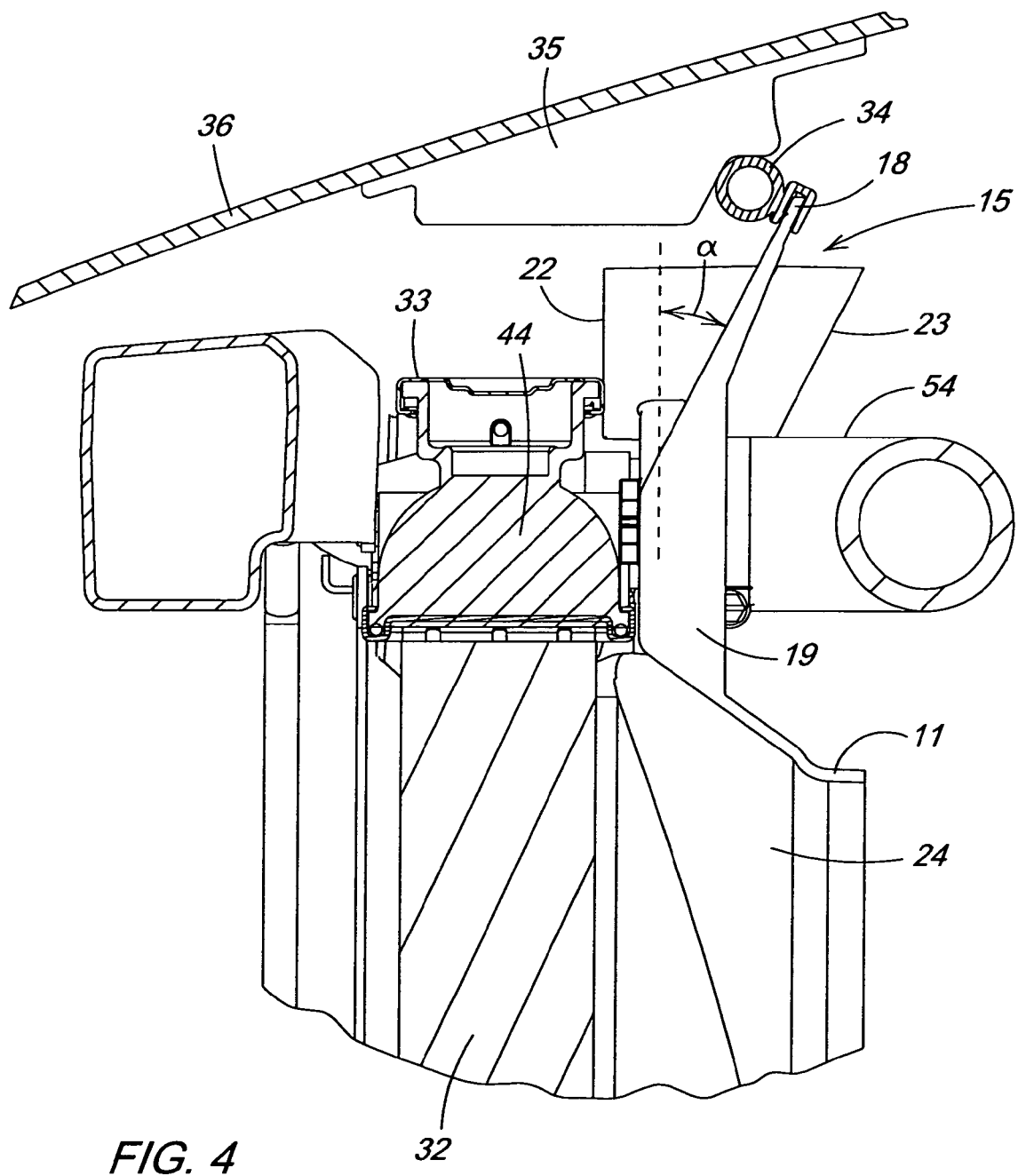
FIG. 4 is a partial section view of the top of the fan shroud and tractor hood of FIG. 3.

FIG. 3 shows an embodiment of fan shroud 10 mounted in the front end of a tractor. The tractor has a frame 38 and hood 30. In one embodiment, the hood may be a one piece metal or polymer structure with a top 36, sides 31, and front or grill 37. The hood may be hinged, or may slide or lift to open. Radiator 32 is mounted to frame 38. As shown in FIG. 4, radiator 32 may have a top tank 44 and a radiator cap 33.

Upper wall 18 and sides 13a, 13b are dimensioned to match the internal geometry of hood 30. Preferably, there is a very small or substantially zero clearance between the hood and these three perimeter surfaces of the fan shroud. In this context, small or substantially zero means less than about one inch measured from upper wall 18 and sides 13a, 13b to the top and sides of the closed hood. Preferably, any variation in the clearance should be plus or minus about ½ inch. Because upper wall 18 and sides 13a, 13b match the internal contour of the hood, they may seal with the hood.

A seal 34 may be provided around the upperwall and sides of the fan shroud. The seal helps reduce or prevent hot air from circulating from the engine to the cool air side of the radiator.

In one embodiment, seal 34 may be a one piece rubber or elastomer bulb seal that seals the perimeter of three surfaces of the fan shroud with the tractor hood when the hood is closed. Seal 34 may be compressed when the hood is closed. Additionally, seal 39 may be provided between the front 37 of the hood and a corresponding surface on or above frame 38.

According to one embodiment, the internal or inwardly facing surfaces of the top and sides of hood 30 may have a ledge 35 or other surface that mates with or matches the profile of the upper wall and sides of the fan shroud. The ledge or other surface may enhance the seal formed between the fan shroud and tractor hood. In an alternative embodiment, a rubber or elastomer seal may be on the hood, to form a seal with a mating surface on the top and sides of the fan shroud.

Having described the preferred embodiment, it will become apparent that various modifications can be made without departing from the scope of the invention as defined in the accompanying claims.

The invention claimed is:

1. An apparatus comprising:
a radiator on a front of a tractor frame;
a tractor hood attached to the front of the tractor frame and having internal top, left and right sides; and
a one piece fan shroud attached to the radiator, the one piece fan shroud having an uppermost peripheral wall portion sloped at an angle of between about 10 degrees and about 60 degrees from vertical to form a seal with the internal top, a combustion air intake opening through the sloped uppermost peripheral wall portion with flanges projecting outwardly from the opening for connection of combustion air intake ducts thereto, and the one piece fan shroud further having generally vertical aligned sides that seal with the left and right sides of the tractor hood.

2. The apparatus of claim 1 wherein the one piece fan shroud has a rubber seal around the uppermost peripheral wall portion and the generally vertical aligned sides thereof.

3. The apparatus of claim 2 wherein the rubber seal is a bulb seal.

4. The apparatus of claim 1 further comprising a ledge around the internal top, left and right sides of the hood.

5. An apparatus comprising:
a radiator assembly having a generally vertically oriented radiator with a one piece molded fan shroud mounted thereto; the one piece molded fan shroud having a rubber seal around three outer surfaces thereof; one of the three outer surfaces extending at an angle of between about 10 degrees and about 60 degrees from vertical at an outermost peripheral portion thereof and having a combustion air intake opening extending through the angled outermost peripheral portion with hose connection flanges projecting outwardly therefrom; wherein the radiator assembly is mounted on the frame on the front end of a tractor having a hinged hood, the rubber seal mating with the internal surfaces of the hinged hood.

\* \* \* \* \*